Jan. 19, 1943.  C. M. JOHNSON  2,308,695
SEPARABLE FASTENER
Filed Sept. 26, 1939
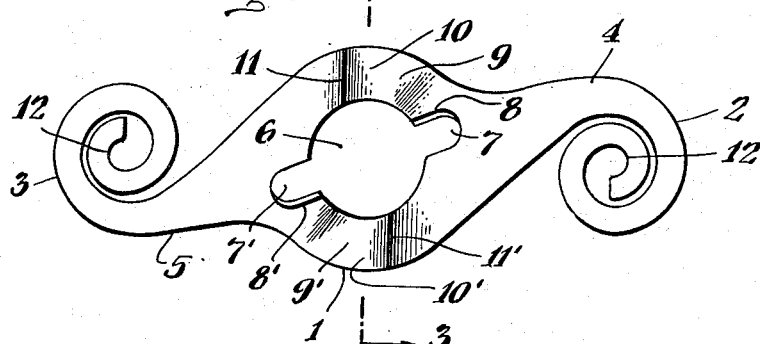
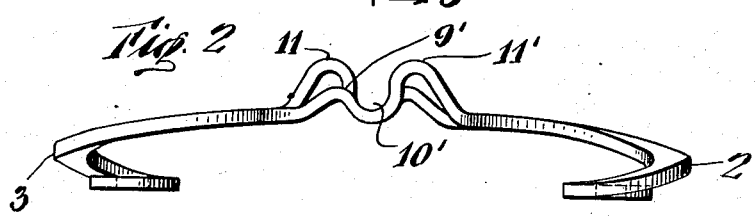
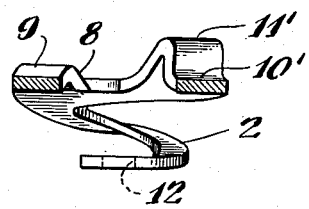
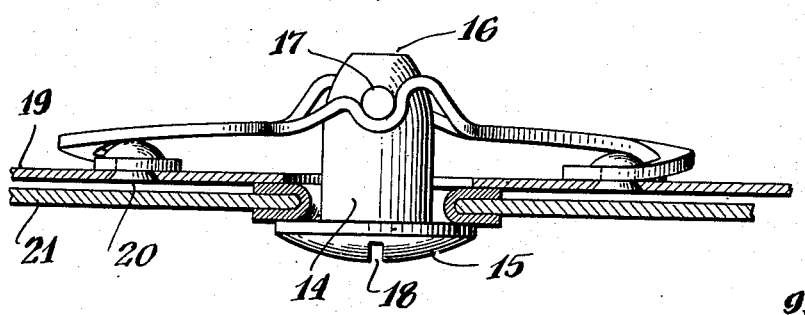
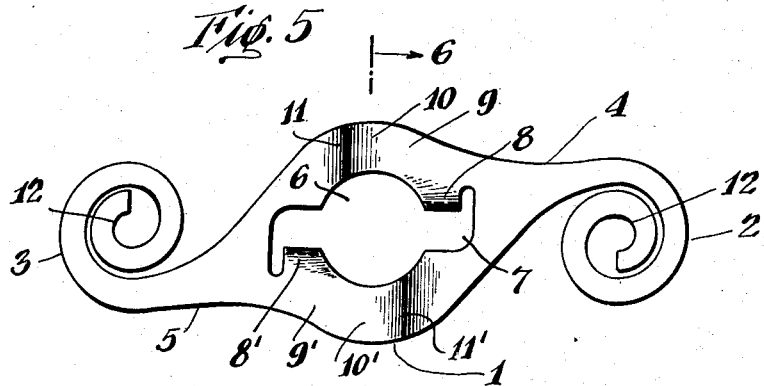
Corydon M. Johnson
INVENTOR
BY
Blair, Curtis, Dimmer Haynard
ATTORNEYS Patented Jan. 19, 1943

2,308,695

UNITED STATES PATENT OFFICE 2,308,695

SEPARABLE FASTENER

Corydon M. Johnson, Freeport, N. Y.

Application September 26, 1939, Serial No. 296,539

3 Claims. (Cl. 24—221)

This invention relates to a separable fastener that is adapted to positively lock together two relatively movable parts.

As the fastener is admirably adapted to secure together two relatively movable plates, and as the fixed plate and the movable plate of an aeroplane or automobile cowling are familiar examples of two such relatively movable plates, I will describe the invention in connection with such a cowling, but it is to be understood that it is not limited in its use to either an aeroplane or automobile cowling, or, indeed, to two relatively movable plates, inasmuch as it is adapted for use in securing together relatively movable members of forms other than plates.

In the drawing:

Figure 1 is a plan view of the preferred form of the female fastener element;

Figure 2 is a side elevation of the same;

Figure 3 is a vertical sectional view on line 3—3 of Figure 1;

Figure 4 is a side elevation of the male and female elements engaged together and showing their relationship to the movable and fixed plates such as those of an aeroplane or automobile cowling when the fastener elements are in their locking position;

Figure 5 is a plan view of another form of my device; and

Figure 6 is a section on the line 6—6 of Figure 5.

In the form of the invention disclosed in Figures 1 to 4 of the drawing the female element includes a body portion 1 and end portions 2 and 3. The end portions 2 and 3 are integrally attached to the body portion 1 by neck portions 4 and 5 respectively.

This female element is formed preferably of a sheet of flat metal that is preferably resilient throughout but that, in any event, is resilient in its end portions 2 and 3.

The end portions 2 and 3 are of involute form so that, being resilient, they form involute springs both of which progress toward their free ends in clockwise directions. These springs that are arranged at the opposite ends of the body portion extend from opposite sides of the body portion, being connected thereto by the neck portions 4 and 5 hereinbefore referred to, and these end portions 2 and 3 forming the involute springs, while preferably of constant thickness, are of diminishing width toward their free ends with the result that the resiliency increases from the body portion toward the ends of the springs.

The body portion 1 of the female element is spaced from the common plane of the ends of the two springs 2 and 3.

The body portion 1 of the female element is provided with an opening 6, the center of which lies preferably in a line extending between the centers of the involutes of the springs 2 and 3. In other words, all of the three centers are in alignment in the preferred embodiment of the invention. This opening 6 is provided with slots 7 which extend from the opening outwardly and preferably in diametrically opposite directions.

Thus the opening 6 with the slots 7 forms in effect a double keyhole arrangement. At one side and toward one end of the body portion 1 a cam 8 is formed which leads to a hill 9 and a dale 10 which latter forms a seat for part of the male fastener element as will later be pointed out. Beyond the dale 10 an abutment 11 is formed.

Preferably diametrically opposite the cam 8, the hill 9, the dale 10 and the abutment 11 a cam 8', a hill 9', a dale 10' and an abutment 11' is formed on the body portion 1.

It is to be noted that the body portion 1 tapers toward the necks 4 and 5 so that its resiliency increases from its central portion toward the springs 2 and 3, with the result that the effect of the load applied to the center of the body portion 1 is gradually absorbed toward the ends of the springs 2 and 3, so that the entire stress is not placed upon the ends of the springs.

As I have pointed out, this female element is made preferably of a single piece of sheet metal preferably resilient from end to end, and certainly resilient at the ends where the springs are formed, and it is of such construction that the female element may be formed from a flat sheet of strip metal in two operations. The first operation will be a blanking out operation which will entail the use of a die that blanks out the female element in its proper contour. At the same time this die may form holes 12 in the ends 2 and 3 of the element, the holes being indicated in Figure 1 partly in dotted lines. Simultaneously with the forming of these holes the springs may be formed at the ends of the body portion 1 by the same die which will cut each of the springs in an ever decreasing radius from the necks 4 and 5, particularly by shearing action without the removal of any metal, and will at the same time blank out the tapered end portion of each spring.

Simultaneously with the blanking out of the female element and the formation of the springs at the side thereof, the hole 6 and the slots 7 are formed.

The cams 8—8', the hills 9—9', the dales 10—10' and the abutments 11—11', are next formed in a single operation and by the use of a single die, thus completing the formation of the female element.

It will be seen that from a single strip of flat metal the female element may be formed completely by two operations of the die.

The male element is preferably in the form of a stud 14 that is provided with a head 15, preferably a tapered end 16 and a cross head consisting of lugs 17 that extend from the stud 14 remote from the head 15 and in such directions as to register with the slots 7 when the stud 14 is inserted in the hole 6. Of course if the slots 7 are diametrically opposite each other the lugs 17 will be in the same relationship.

The head 15 is provided with some operating means by which it may be turned, such, for instance, as a slot 18 into which a screw driver or like implement may be inserted. The lugs 17 project from the stud 14 a sufficient distance so that when they are engaged with the body portion 1, whether it be with the cams 8—8', the hills 9—9', or the dales 10—10', they will project a considerable distance over the body portion of the female member and have an extensive contact therewith. They may extend the complete distance to the edge of the body portion, or they may, if desired, terminate short of, or beyond, that edge.

In assembling the separable fastener the female element is secured to either the fixed plate or the movable plate 19 by securing means 20, such, for instance, as rivets that engage the ends of the springs 2 and 3 and project through the holes 12 hereinbefore referred to.

The stud 14 of the element extends through an opening in the complemental plate 21 against one face of which plate the head 15 is adapted to engage.

The lugs 17 are of such length that the male element is prevented from accidental removal from the hole in the plate 21 by the engagement of the lugs 17 with the plate.

This relationship may be accomplished by, for instance, inserting the pin which forms the lugs 17 into the stud of the male element after it has been extended through the hole in the plate 21. The accidental removal or displacement of the male element is prevented because of the fact that the lugs are of greater length than the diameter of the hole through the plate 21.

When the female element is assembled with the plates 19 and 21, the opening 6 in the female element is brought in registration with the opening in the plate 21 through which the male element extends. Thus, after the male element has been asembled with the plate 21 and the female element with the plate 19 and these plates brought together, the male element may be actuated to bring the lugs 17 into alignment with the slot 7 of the body portion of the female element. When the two plates 19 and 21 are brought together and the lugs 17 brought into alignment with the slot 7, the lugs will move to the opposite side of the female element because of the length of the stud 14 and their positions on the stud.

After assuming this position the stud 14 may be turned by means of an implement such as hereinbefore referred to in cooperation with the slot 18 on the head 15, which will cause the lugs 17 to ride up on the cams 8 and 8'. During this operation the body portion of the female element will be depressed, or, in other words, moved toward the head 15 of the male element. This force developed by this depression of the female element will compress the springs 2 and 3 and, of course, will tend to move the center points of the springs 2 and 3 away from the center of the hole 6. However, this tendency will be resisted by the rivets 20, but because of the fact that the springs 2 and 3 are helical this force will be absorbed by the unwinding of the springs.

When the lugs 17 reach the hills 9 and 9' they will snap into the dales 10 and 10' and will be arrested in their rotative movement by the abutments 11 and 11'. Of course when these lugs 17 snap into the dales 10 the springs 2 and 3 will attempt to restore themselves to their initial positions, both axially and radially. However, the bottoms of the dales 10 are somewhat above the surface of the body portion 1 of the female element so that the springs never restore themselves to their initial positions so long as the lugs are engaged in the dales, and failing so to do will exert resilient pressure on the lugs which will effectively secure the male and female elements together and consequently, because of their attachment to the plates 19 and 21, will secure these plates together. Of course while it is desirable to have the bottom of the dales 10 above the surface of the body portion 1 of the female element, this is not absolutely essential because the lugs cannot escape from the dales without riding up on the hills 9 of the cams, and to ride up on the hills it is of course necessary to compress the springs 2 and 3, and this may not be done except manually.

In the form of female element shown in Figures 5 and 6 of the drawing, the cams 8 are extended below the surface of the body portion 1. In this form it is not necessary to have the distance between the lugs 17 and the head 15 sufficient to enable the lugs to extend through the slots 7 but only to a distance sufficient to engage the protruding ends of the cams 8 and 8'. The manual operation of this form of device will be the same as hereinbefore described.

Of course in this form the cams 8 and 8' and the hills 9 and 9' need not actually rise above the upper surface of the body portion 1, and the dales 10 and 10' may actually be below that surface.

It is to be noted that this form of separable fastener is one in which the locking will be positive, and because of the line contact as distinguished from point contact of the lugs 17 with the surface of the body portion 1 of the female element, while the elements are being locked together the wearing of the elements will be resisted so that all of the elements of the entire combination will maintain their original relationship unaltered by relative wear. Moreover, when the lugs 17 are seated in the dales 10 they will have an extensive surface contact with the upper face of the body portion 1 of the female element, with the result that the resistance by the springs 2 and 3 to the disengagement of the elements will be augmented by the friction between these parts.

It is to be noted that by placing the centers of the springs or of the rivets 20 in alignment with the center of the hills 9 and 9', cams 8 and 8', and the lugs 17, each end of the female element is subjected to the same stresses and strains as those to which the opposite end is subjected and at the same times, so that in repeated operations of the separable fastener, if there is any physical change in the female element, it will be the same at each end and therefore the operation will always be uniform.

While I have illustrated and described particular embodiments of my invention, I wish it to be understood that I am not limited to those embodiments except in so far as made necessary by the claims because I contemplate that other embodiments may be made without departing from the scope of the claims.

What I claim is:

1. A flat metallic blank for a fastener element including a body portion and end portions, the end portions being in the form of an involute and decreasing in width from the body portion to their ends.

2. In a sheet metal female fastener element, a relatively large body portion having an opening therein adapted to receive a male fastener element, integral neck portions extending from the body portion, and substantially spiral involute portions integral with the neck portions and adapted to receive attaching elements, the neck portions decreasing in width toward the involute portions, each involute portion having an aperture therein for the reception of a fastener element.

3. In a sheet metal female fastener element, a relatively large body portion having an opening therein adapted to receive a male fastener element, integral neck portions extending from the body portion, and substantially spiral involute portions integral with the neck portions and adapted to receive attaching elements, the neck portions decreasing in width toward the involute portions, the axial centers of the opening in the body portion and of the involutes lying in a straight line whereby when downward pressure is applied to the portion through the male fastener element one involute portion will have radial and axial movements substantially equal to those of the other involute portion.

CORYDON M. JOHNSON.